United States Patent
Bilen et al.

(10) Patent No.: US 11,585,396 B2
(45) Date of Patent: Feb. 21, 2023

(54) METHOD FOR AUTOMATICALLY WARMING UP A CLUTCH ACTUATOR

(71) Applicant: Volvo Truck Corporation, Gothenburg (SE)

(72) Inventors: Ödül Bilen, Hisings Backa (SE); Magnus Blanckenfjell, Hisings Kärra (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/548,705

(22) Filed: Dec. 13, 2021

(65) Prior Publication Data

US 2022/0186796 A1    Jun. 16, 2022

(30) Foreign Application Priority Data

Dec. 14, 2020 (SE) .................................... 2051456-8

(51) Int. Cl.
*F16D 48/06* (2006.01)
*F16D 48/08* (2006.01)

(52) U.S. Cl.
CPC ........... *F16D 48/066* (2013.01); *F16D 48/08* (2013.01); *F16D 2300/04* (2021.01); *F16D 2500/1026* (2013.01); *F16D 2500/1028* (2013.01); *F16D 2500/10412* (2013.01); *F16D 2500/30404* (2013.01); *F16D 2500/30803* (2013.01); *F16D 2500/3122* (2013.01); *F16D 2500/50808* (2013.01); *F16D 2500/511* (2013.01); *F16D 2500/7041* (2013.01); *F16D 2500/70406* (2013.01); *F16D 2500/7109* (2013.01)

(58) Field of Classification Search
CPC ................... F16D 2300/04; F16D 2300/50808
See application file for complete search history.

(56) References Cited

U.S. PATENT DOCUMENTS

| | | | |
|---|---|---|---|
| 5,667,051 A | 9/1997 | Goldberg et al. | |
| 2004/0159520 A1* | 8/2004 | Anwar | F16D 48/066 |
| | | | 192/85.61 |

(Continued)

FOREIGN PATENT DOCUMENTS

| | | |
|---|---|---|
| DE | 102012220242 A1 | 5/2014 |
| EP | 2060820 A2 | 5/2009 |
| WO | 2019072383 A1 | 4/2019 |

OTHER PUBLICATIONS

Swedish Search Report dated Jun. 15, 2021 for Swedish Patent Application No. 2051456-8, 4 pages.

*Primary Examiner* — Timothy Hannon
(74) *Attorney, Agent, or Firm* — Sage Patent Group

(57) ABSTRACT

A method for automatically warming up a clutch actuator for a clutch of a transmission in a vehicle, wherein the clutch actuator is operable by use of pressurized fluid and configured to actuate the clutch from an engaged to a disengaged state, and/or vice versa, the method including:
identifying if a temperature is below a predetermined temperature value and if the clutch actuator is leaking, and if it is identified that the temperature is below the predetermined temperature value and that the clutch actuator is leaking; then
repeatedly pressurizing the clutch actuator by use of the pressurized fluid until a state is reached indicative of the clutch actuator being functional, or until a maximum run out state is reached indicative of a faulty clutch actuator.

11 Claims, 3 Drawing Sheets

(56) References Cited

U.S. PATENT DOCUMENTS

| | | |
|---|---|---|
| 2009/0205408 A1 | 8/2009 | Karlsson et al. |
| 2019/0186562 A1 | 6/2019 | Ruchardt et al. |
| 2019/0186564 A1 | 6/2019 | Ruchardt et al. |
| 2020/0055520 A1 | 2/2020 | Glockner et al. |

* cited by examiner

METHOD FOR AUTOMATICALLY WARMING UP A CLUTCH ACTUATOR

CROSS-REFERENCE TO RELATED APPLICATIONS

The present application claims benefit of priority to Swedish Patent Application No. 2051456-8, filed Dec. 14, 2020, and is assigned to the same assignee as the present application and is incorporated herein by reference.

TECHNICAL FIELD

The disclosure relates to a method for automatically warming up a clutch actuator for a clutch of a transmission in a vehicle. The disclosure also relates to a transmission control unit for a clutch actuator, a transmission and to a vehicle comprising the transmission.

The disclosure can be applied in heavy-duty vehicles, such as trucks, buses and construction equipment. Although the disclosure will be described with respect to a heavy-duty truck, the disclosure is not restricted to this particular vehicle, but may also be used in other vehicles such as light-weight trucks, light-weight buses, wheel loaders, excavators, and also passenger cars.

BACKGROUND

A vehicle transmission may to at least some degree be automated. For example, it is known to use so called Automated Mechanical Transmissions (AMT) for heavy-duty trucks. The AMT comprises a clutch which is actuated by use of a clutch actuator. The clutch actuator is typically actuated by use of pressurized air, but also other actuating techniques are possible, such as using a hydraulic clutch actuator instead of a pneumatic clutch actuator.

The clutch can be actuated by the clutch actuator between an engaged state and a disengaged state, and typically the clutch is biased, e.g. spring-biased, towards one of the states. For example, the clutch may be spring-biased towards the engaged state, whereby the clutch actuator is used for actuating the clutch from the engaged state to the disengaged state.

It has been found that the clutch actuators may experience problems when the vehicle is started in cold conditions. For example, clutch actuator cylinders using pressurized air may sometimes experience problems with air leakage when it is too cold. As such, with the above-mentioned clutch which is spring-biased towards the engaged state, the clutch may not be able to disengage when it is too cold, or at least it may be difficult to control the clutch in a normal manner.

To this end, it has been proposed in US 2019/0186562 A1 to warm up the clutch by increasing the rotational speed of a drive aggregate to a speed which is higher than an idling speed.

However, it has been realized that there is a need to provide a further improved method for warming up a clutch actuator, or at least to find a suitable alternative.

SUMMARY

In view of the above, an object of the disclosure is to provide an improved method for automatically warming up a clutch actuator for a clutch of a transmission in a vehicle, or at least to provide a useful alternative. Another object of the disclosure is to provide an improved transmission control unit, an improved transmission and a vehicle.

According to a first aspect of the disclosure, the object is achieved by a method according to claim 1. Thus, a method for automatically warming up a clutch actuator for a clutch of a transmission in a vehicle is provided. The clutch actuator is operable by use of pressurized fluid and configured to actuate the clutch from an engaged to a disengaged state, and/or vice versa. The method comprises:

identifying if a temperature is below a predetermined temperature value and if the clutch actuator is leaking, and if it is identified that the temperature is below the predetermined temperature value and that the clutch actuator is leaking; then repeatedly pressurizing the clutch actuator by use of the pressurized fluid until a state is reached indicative of the clutch actuator being functional, or until a maximum run out state is reached indicative of a faulty clutch actuator.

By the provision of a method as disclosed herein, an improved method for warming up a clutch actuator is achieved. It has namely been realized that by use of the pressurized fluid, which is energized when pressurized, the energy in the fluid can efficiently warm up seals of the clutch actuator which are too cold to function properly. More specifically, it has been realized that it is beneficial to repeatedly pressurize the clutch actuator, since the pressurizing repetitions may increase the amount of energy in the fluid, thereby warming up the seals more rapidly. Consequently, the warming up procedure can be shortened, allowing the vehicle to take off in shorter time after a cold start.

By repeatedly pressurizing the clutch actuator is herein meant to perform a series of pressurizing repetitions. Accordingly, the series of pressurizing repetitions are performed in a repetitive manner by applying pressure followed by releasing pressure.

The application of pressure should be of a magnitude and/or have a duration which is intended to result in a movement of the clutch actuator for actuating the clutch when the clutch actuator is functional. In some embodiments, the application of pressure should be of a magnitude and/or have a duration intended to actuate the clutch from the engaged state to the disengaged state, or vice versa, when the clutch actuator is functional.

In a similar manner, the release of pressure should be of a magnitude and/or have a duration which is intended to result in a movement of the clutch actuator for actuating the clutch when the clutch actuator is functional. In some embodiments, the release of pressure should be of a magnitude and/or have a duration intended to move the clutch from the disengaged state to the engaged state, or vice versa, when the clutch actuator is functional.

For example, the application of pressure may be of a magnitude which corresponds to a maximum possible application of pressure. This implies a faster warming up procedure.

As another example, the release of pressure may mean that all the pressure is released. As such, by way of example, the pressurizing repetitions may repetitively alter between applying maximum possible pressure and no pressure.

Optionally, the pressurizing repetitions may be repeated with a predetermined time interval. The predetermined time interval may be adjusted, such as adjusted in dependence on the temperature. Thereby, the method may be adapted to the current temperature condition, implying a further improved warming up procedure. In other words, a fast warming up procedure may be achieved, implying increased service life. By way of example, the predetermined time interval may correspond to applying pressure during a specific time period, such as during 1-10 seconds, followed by releasing pressure, wherein the pressure is released during a specific time period, such as during 1-10 seconds, until pressure is applied again. Still optionally, the pressure for the pressurizing repetitions may be adjusted between and/or during the pressurizing repetitions. Thereby, a more flexible warming up procedure may be achieved, allowing e.g. the speed of the warming up procedure to be accelerated after an end of a pre-phase of the warming up-procedure. The pre-phase may use a lower pressure and/or a longer time interval between the pressurizing repetitions, allowing other components to e.g. be lubricated before increasing the frequency of the repetitions and/or the pressure.

Optionally, identifying if the clutch actuator is leaking may comprise:
identifying if a leaking condition is fulfilled which is indicative of an unallowable positional change and/or an unallowable pressure drop over time of the clutch actuator when the clutch actuator is pressurized by the pressurized fluid, and/or identifying if the clutch actuator does not reach the disengaged or engaged state when the clutch actuator is pressurized by the pressurized fluid.

Thereby, the leaking condition may be identified in a reliable manner, indicative of a real leakage of the clutch actuator. As such, it may be more reliably identified that it is actually the clutch actuator which is leaking, and not any other possible fault.

Optionally, the state indicative of the clutch actuator being functional may be determined by identifying if a functional condition is fulfilled which is indicative of an allowable positional change and/or an allowable pressure drop over time of the clutch actuator when the clutch actuator is pressurized. Determining if the clutch actuator is functional in this manner has been found to reliably determine if the clutch actuator is functional or not. For example, the functional condition may be a threshold value, implying facilitated identification, requiring e.g. less processing power.

Optionally, the maximum run out state may be determined by identifying that the clutch actuator does not reach the disengaged or engaged state after a predetermined number of pressurizing repetitions have been performed and/or after a predetermined run out time has been reached. Still optionally, the predetermined number of pressurizing repetitions and/or the predetermined run out time may be adjustable with respect to the temperature. Still optionally, the predetermined number of pressurizing repetitions and/or the predetermined run out time may be set to automatically vary with respect to the temperature. In view of the foregoing, a more versatile and/or adaptable method may be achieved. For example, fewer pressurizing repetitions may be allowed if the temperature is not too low in comparison to if the temperature is very low. Purely by way of example, fewer pressurizing repetitions may be allowed if the temperature is about −15 degrees Celsius in comparison to if the temperature is −25 degrees Celsius.

Optionally, the temperature may be at least one of a clutch actuator temperature, a transmission oil temperature and an ambient temperature with respect to the vehicle. For example, one or more sensors may advantageously be used which are configured to measure the temperature at one or more locations.

Optionally, the predetermined temperature value may correspond to a glass transition temperature of a seal for sealing a fluid chamber of the clutch actuator. The predetermined temperature value may be the glass transition temperature, or it may be set with a safety margin with respect to the glass transition temperature. Still optionally, the predetermined temperature value may be adjustable. For example, it has been realized that the seals, made of e.g. rubber or the like, may deteriorate over time, and this may have an effect on the temperature at which the seals function properly. Thereby, by adjusting the predetermined temperature value, the warming up procedure may be better adapted for the current condition of the seals.

Optionally, the clutch actuator is a pneumatic clutch actuator. Alternatively, the clutch actuator is a hydraulic clutch actuator. Still optionally, the clutch actuator may be biased, such as spring-biased, towards the engaged or the disengaged state.

Optionally, the fluid for the clutch actuator may be pressurized by a compressor. The compressor may be driven by power from an internal combustion engine of the vehicle, power from an electric motor of the vehicle, and/or electric power from a battery or from the power grid.

Optionally, the method may further comprise preventing the vehicle from taking off until the warming up procedure is completed. Thereby it can be assured that the clutch actuator is working properly before the vehicle is allowed to take off.

Optionally, the method may further comprise notifying a user, such as a driver, when the clutch actuator is warming up. Thereby, the user, typically the driver, will know that the clutch actuator is warming up, implying increased awareness for the user.

Optionally, the method may further comprise prohibiting any clutch fault codes until after the warming procedure has finished. It has been realized that a too cold clutch actuator may lead to fault codes of the transmission when the vehicle is started. A fault code may be defined as issuing of a signal which is indicative of a transmission fault. By prohibiting any such fault codes before the clutch actuator has been warmed up, unnecessary fault codes may not be issued. Thereby, a user may not take any unnecessary actions, such as contacting a workshop, due to the unnecessary fault codes.

According to a second aspect of the disclosure, the object is achieved by a transmission control unit according to claim 8. Thus, a transmission control unit for a clutch actuator for a clutch of a transmission is provided. The transmission control unit is configured to perform the method according to any one of the embodiments of the first aspect of the disclosure. For example, the transmission control unit is configured to issue a signal to repeatedly pressurizing the clutch actuator as disclosed herein.

Advantages and effects of the second aspect are largely analogous to the advantages and effects of the first aspect of the disclosure.

The transmission control unit is an electronic control unit and may comprise processing circuitry, hardware and/or software, one or more memory units etc. The transmission control unit may be a computer. It may also be constituted by two or more sub-control units.

The object of the disclosure is also achieved by a computer program comprising program code means for performing the steps of any one of the embodiments of the first aspect of the disclosure, when said program is run on a computer, such as on the aforementioned transmission control unit.

Still further, the object of the disclosure is also achieved by a computer readable medium carrying a computer program comprising program code means for performing the steps of any one of the embodiments of the first aspect of the disclosure when said program product is run on a computer, such as on the aforementioned transmission control unit.

According to a third aspect of the disclosure, the object is achieved by a transmission for a vehicle according to claim 9. Thus a transmission for a vehicle is provided which comprises a clutch and a clutch actuator for actuating the clutch from an engaged to a disengaged state, and/or vice versa, wherein the transmission further comprises the transmission control unit according to any one of the embodiments of the second aspect of the disclosure.

Advantages and effects of the third aspect are largely analogous to the advantages and effects of the first and second aspects of the disclosure. It shall also be noted that all embodiments of the first and second aspects are combinable with all embodiments of the third aspect of the disclosure, and vice versa.

According to a fourth aspect of the disclosure, the object is achieved by a vehicle according to claim 10, which comprises the transmission according to any one of the embodiments of the third aspect of the disclosure.

Advantages and effects of the fourth aspect are largely analogous to the advantages and effects of the first, second and third aspects of the disclosure. It shall also be noted that all embodiments of the first, second and third aspects are combinable with all embodiments of the fourth aspect of the disclosure, and vice versa.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the disclosure cited as examples.

In the drawings.

Figure 1:
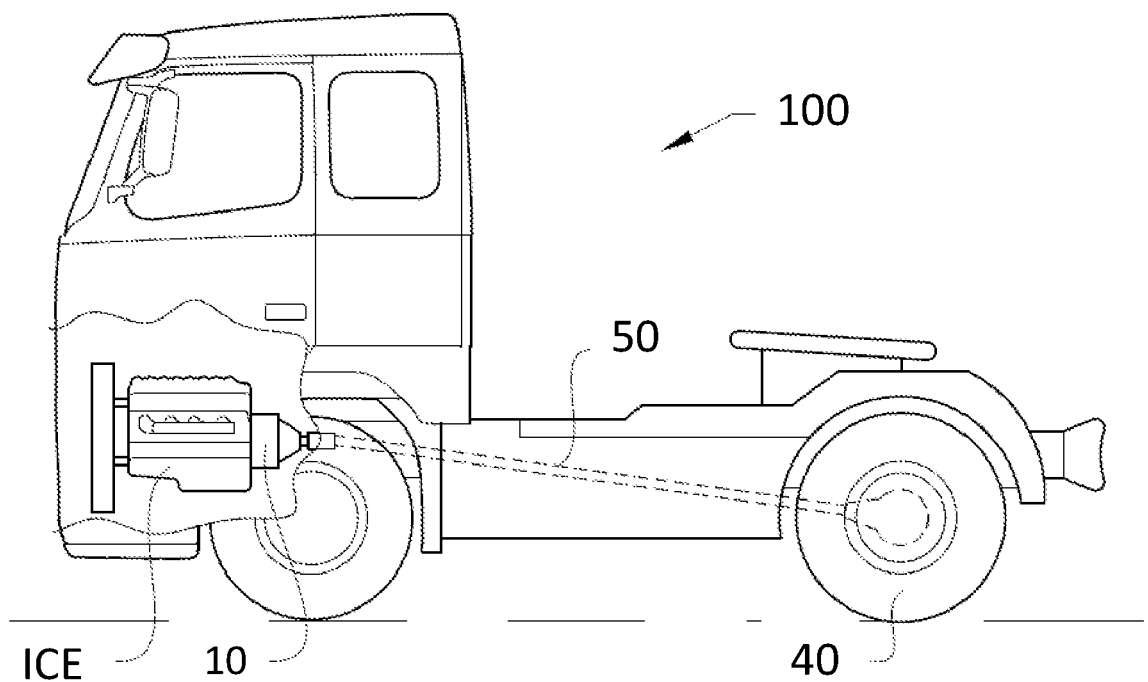
FIG. 1 is a side view vehicle according to an example embodiment of the present disclosure.

The drawings show diagrammatic exemplifying embodiments of the present disclosure and are thus not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure. Like reference characters refer to like elements throughout the description, unless expressed otherwise.

DETAILED DESCRIPTION

FIG. 1 shows a side view of a vehicle 100 according to an example embodiment of the present disclosure. The vehicle 100 is here a heavy-duty truck, adapted to tow one or more trailers (not shown). It shall however be understood that the disclosure is not limited to only this type of vehicle, but may also be used for other types of vehicles as e.g. mentioned herein. The vehicle 100 comprises an internal combustion engine, ICE, which is drivingly connected to a transmission 10 according to an example embodiment of the disclosure. The transmission 10 drivingly connects the ICE to a propulsion shaft 50, which in turn is drivingly connected to drive wheels 40.

Figure 2:
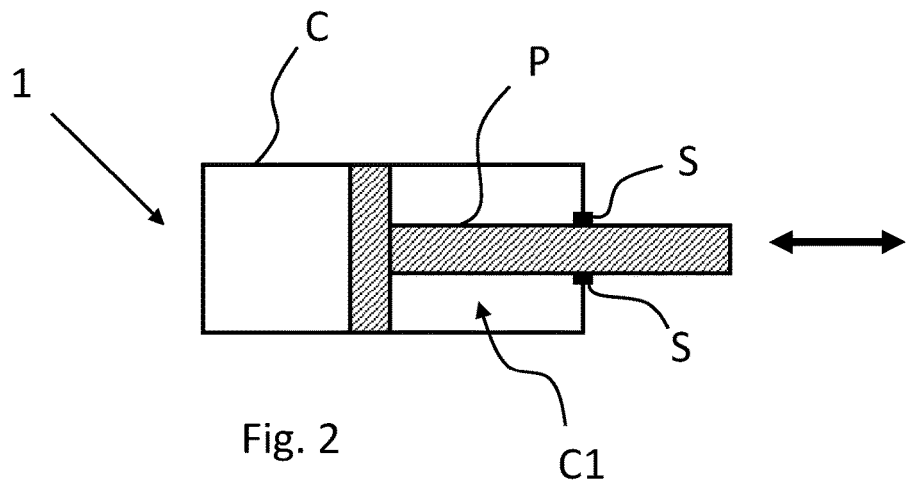
FIG. 2 is a schematic cross-sectional view of a clutch actuator according to an example embodiment of the present disclosure.
Figure 3:
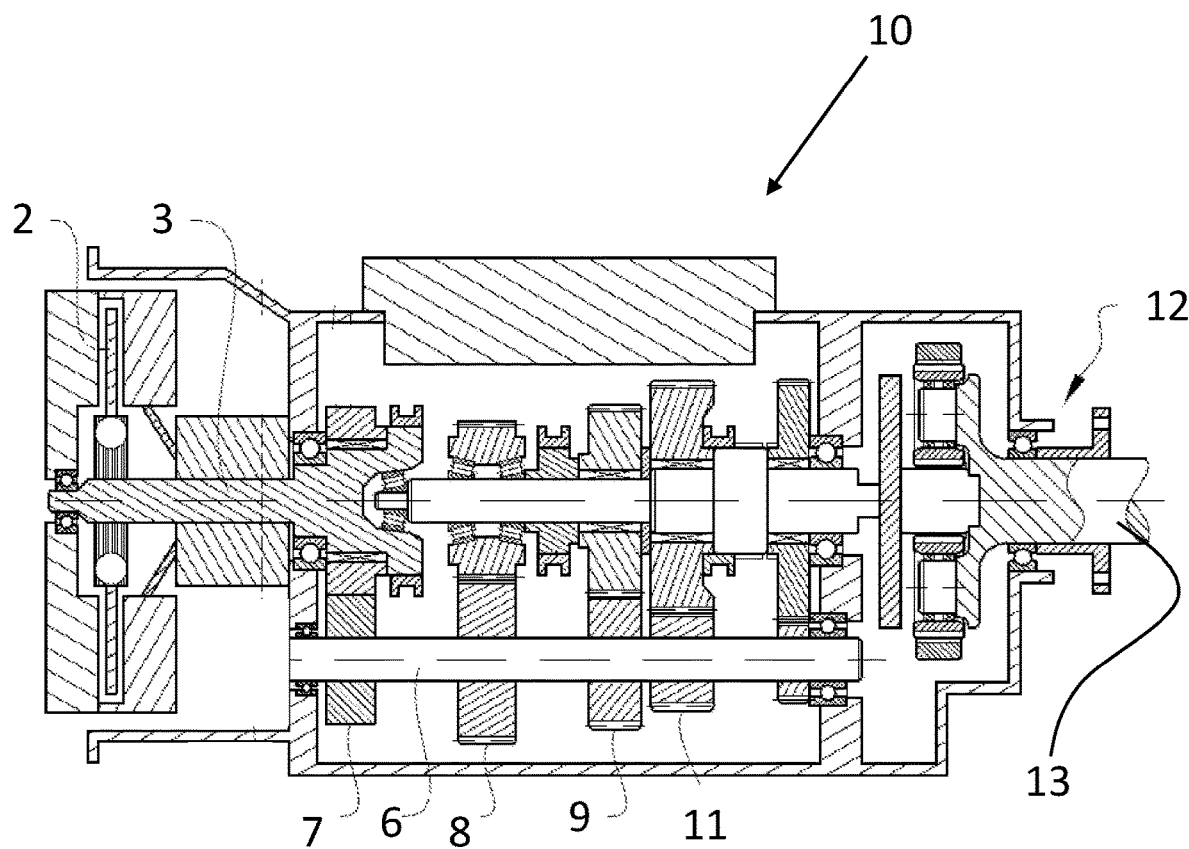
FIG. 3 is a cross-sectional view of a transmission according to an example embodiment of the present disclosure.

FIG. 2 shows a cross-sectional and simplified view of a clutch actuator 1 for actuating a clutch 2 as e.g. shown in FIG. 3. Accordingly, FIG. 3 shows a cross-sectional view of a transmission 10 according to an example embodiment.

The transmission 10 as shown is an Automated Manual Transmission, AMT. It comprises a clutch 2 for selectively engaging and disengaging the ICE to an input shaft 3 of the transmission 10. The transmission 10 as shown further comprises an intermediate shaft 6, a number of gear wheels 7, 8, 9, 11 and a range gear 12. The range gear 12 is drivingly connected to an output shaft 13. The output shaft 13 may be drivingly connected to the propeller shaft 50. It shall be understood that the transmission 10 may be any type of transmission known to a skilled person, with e.g. more or fewer gear wheels as shown in FIG. 3, with and without the range gear 12 etc. As such, the transmission 10 as shown in FIG. 3 is only one example embodiment of a transmission according to the present disclosure.

The clutch actuator 1 as shown in FIG. 2 for actuating the clutch 2 comprises a cylinder C and a piston P which is movable back and forth in the direction of the shown arrow. Accordingly, any positional change of the clutch actuator 1 is referring to a positional change of the piston P. The clutch actuator 1 further comprises at least one seal S for sealing a fluid chamber C1 which is defined and delimited by inner walls of the cylinder C. It shall be understood that the clutch actuator 1 as shown is simplified. As such, the clutch actuator 1 may comprise more parts, such one or more valves, more seals etc. The piston P is actuated by pressurizing the inside of the cylinder C by a fluid, such as by pressurized air.

Figure 4:
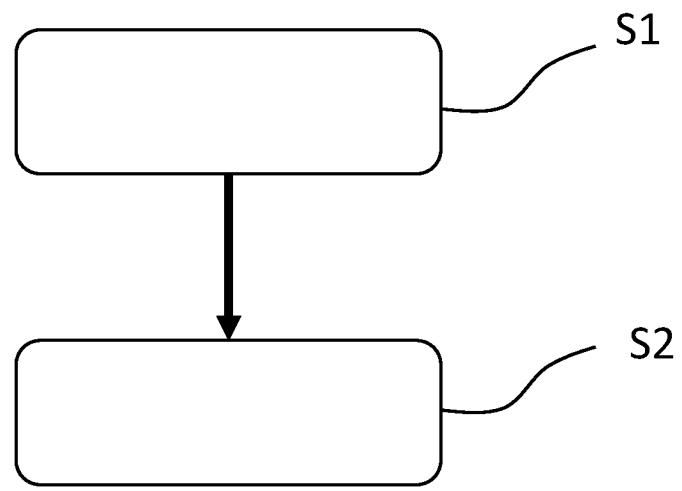
FIG. 4 is a flowchart of a method according to an example embodiment of the present disclosure.

Referring to FIGS. 2-3, and also to FIG. 4 which shows a flowchart, a method according to example embodiments of the disclosure will be described.

Thus, a method for automatically warming up a clutch actuator 1 for a clutch 2 of a transmission 10 in a vehicle 100 is provided, wherein the clutch actuator 1 is operable by use of pressurized fluid and configured to actuate the clutch 2 from an engaged to a disengaged state, and/or vice versa. The method comprises: S1: identifying if a temperature is below a predetermined temperature value and if the clutch actuator 1 is leaking, and if it is identified that the temperature is below the predetermined temperature value and that the clutch actuator 1 is leaking; then S2: repeatedly pressurizing the clutch actuator 1 by use of the pressurized fluid until a state is reached indicative of the clutch actuator 1 being functional or until a maximum run out state is reached indicative of a faulty clutch actuator 1.

The predetermined temperature value may for example be in the range of −5 to −30 degrees Celsius.

Identifying if the clutch actuator 1 is leaking may comprise:
identifying if a leaking condition is fulfilled which is indicative of an unallowable positional change and/or an unallowable pressure drop over time of the clutch actuator 1 when the clutch actuator 1 is pressurized by the pressurized fluid. For example, it may be identified that the clutch actuator 1, i.e. the piston P, is moving at an unallowable speed when the clutch actuator 1 is pressurized, which may be considered as an unallowable positional change over time.

Additionally, or alternatively, identifying if the clutch actuator 1 is leaking may comprise:
identifying if the clutch actuator 1 does not reach the disengaged or engaged state when the clutch actuator 1 is pressurized by the pressurized fluid.

The state indicative of the clutch actuator 1 being functional may be determined by identifying if a functional condition is fulfilled which is indicative of an allowable positional change and/or an allowable pressure drop over time of the clutch actuator 1 when the clutch actuator 1 is pressurized. Accordingly, the clutch actuator may comprise a sensor for measuring and obtaining a value indicative of a position of the piston P, and/or it may comprise a sensor for measuring and obtaining a value indicative of pressure in the fluid chamber C1.

The maximum run out state may be determined by identifying that the clutch actuator 1 does not reach the disengaged or engaged state after a predetermined number of pressurizing repetitions have been performed and/or after a predetermined run out time has been reached.

The predetermined number of pressurizing repetitions and/or the predetermined run out time may be adjustable with respect to the temperature.

The temperature may be at least one of a clutch actuator temperature, a transmission oil temperature and an ambient temperature with respect to the vehicle 100.

The predetermined temperature value may correspond to a glass transition temperature of the seal S for sealing the fluid chamber C1 of the clutch actuator 1.

The method is advantageously implemented in a transmission control unit (not shown), by use of hardware and/or software. For example, the transmission control unit may comprise and/or utilize the above-mentioned computer program and/or computer readable medium. For example, the transmission control unit may obtain measurement values from the above-mentioned sensors, i.e. sensors for measuring temperature, pressure and/or position of the piston P. By use of the measurement values, the transmission control unit may issue a signal for controlling the clutch actuator 1 to be repeatedly pressurized as mentioned in the above. The transmission control unit may then also monitor the clutch actuator 1 in order to identify when the state is reached indicative of the clutch actuator 1 being functional, or until a maximum run out state is reached indicative of a faulty clutch actuator 1. In addition, the transmission control unit may also be configured to automatically control shifting of gears in the transmission 10. As such, a versatile transmission control unit may be realized which is adapted to perform various tasks relating the control of the transmission 10.

It is to be understood that the present disclosure is not limited to the embodiments described above and illustrated in the drawings; rather, the skilled person will recognize that many changes and modifications may be made within the scope of the appended claims.

The invention claimed is:

1. A method for automatically warming up a clutch actuator for a clutch of a transmission in a vehicle, wherein the clutch actuator is operable by use of pressurized fluid and configured to actuate the clutch between an engaged and a disengaged state, the method comprising:
   identifying if a temperature is below a predetermined temperature value and if the clutch actuator is leaking; and
   in response to identifying that the temperature is below the predetermined temperature value and that the clutch actuator is leaking, repeatedly pressurizing the clutch actuator by use of the pressurized fluid until the first of:
      a state is reached indicative of the clutch actuator being functional; and
      a maximum run out state is reached indicative of a faulty clutch actuator.

2. The method according to claim 1, wherein identifying if the clutch actuator is leaking comprises:
   identifying if a leaking condition is fulfilled which is indicative of an unallowable positional change and/or an unallowable pressure drop over time of the clutch actuator when the clutch actuator is pressurized by the pressurized fluid.

3. The method according to claim 1, wherein the state indicative of the clutch actuator being functional is determined by identifying if a functional condition is fulfilled which is indicative of at least one of an allowable positional change and an allowable pressure drop over time of the clutch actuator when the clutch actuator is pressurized.

4. The method according to claim 1, wherein the maximum run out state is determined by identifying that the clutch actuator does not reach the disengaged or engaged state after at least one of a predetermined number of pressurizing repetitions have been performed and a predetermined run out time has been reached.

5. The method according to claim 4, wherein the at least one of the predetermined number of pressurizing repetitions and the predetermined run out time is adjustable with respect to the temperature.

6. The method according to claim 1, wherein the temperature is at least one of a clutch actuator temperature, a transmission oil temperature and an ambient temperature with respect to the vehicle.

7. The method according to claim 1, wherein the predetermined temperature value corresponds to a glass transition temperature of a seal for sealing a fluid chamber of the clutch actuator.

8. A transmission control unit for a clutch actuator for a clutch of a transmission, the transmission control unit being configured to perform the method according to claim 1.

9. A transmission for a vehicle comprising a clutch and a clutch actuator for actuating the clutch between an engaged and a disengaged state, wherein the transmission further comprises the transmission control unit according to claim 8.

10. A vehicle comprising the transmission according to claim 9.

11. The method according to claim 1, wherein identifying if the clutch actuator is leaking comprises:
   identifying if the clutch actuator does not reach the disengaged or engaged state when the clutch actuator is pressurized by the pressurized fluid.

* * * * *